Patented July 15, 1952

2,603,646

UNITED STATES PATENT OFFICE 2,603,646

PREPARATION OF 2-MERCAPTO THIAZOLES

Roger A. Mathes, Akron, Ohio, assignor to The B. F. Goodrich Company, New York, N. Y., a corporation of New York No Drawing. Application October 18, 1951, Serial No. 251,985

4 Claims. (Cl. 260—302)

This invention relates to a novel reaction of alpha-thiocyano carbonyl compounds and more specifically pertains to the reaction of alpha-thiocyano carbonyl compounds with water-soluble salts of dithiocarbamic acid whereby a 2-mercapto thiazole is formed.

I have discovered that an alpha-thiocyano carbonyl compound, that is, an aldehyde or ketone having a thiocyano group attached to the carbon which is in turn attached to the carbonyl group of the aldehyde or ketone, will react with a water-soluble salt of dithiocarbamic acid in the presence of a dilute aqueous solution of a mineral acid, water is split out and there is produced a 2-mercapto thiazole. This reaction is believed to take place as indicated in the following reaction equation where HCl is employed to illustrate the mineral acid and ammonium dithiocarbamate is employed to illustrate the water-soluble dithiocarbamic acid salt:

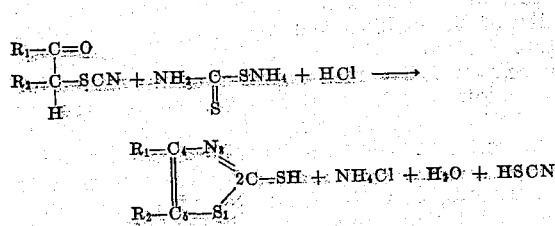

where $R_1$ and $R_2$ comprise the non-reactive residue of the thiocyano carbonyl. Generally $R_1$ and $R_2$ are hydrogen or hydrocarbon radicals containing 1 to 10 carbon atoms. Because of the nature of the dithiocarbamate it is preferred that the reaction be carried out at a temperature of from 0° to 30° C., for at temperatures in excess of 50° C. the dithiocarbamates decompose quite readily.

The novel reaction of this invention provides a method for preparing 2-mercapto thiazoles which does not involve the use of chlorinated reactants as do certain of the methods of the prior art. This is particularly advantageous for many reasons. One method which the prior art discloses for the preparation of 2-mercapto thiazoles is the reaction of an alpha-halo ketone with ammonium dithiocarbamate. The monochloro ketones are, in general, lachrymators and cause no little discomfort when through leaks in the process equipment they escape to the atmosphere in which the chemical operator works. Also these chloro ketones, in general, cause slow healing blistering of the skin when by chance they come into contact with the skin. In addition the chloro ketones attack many materials ordinarily employed for gaskets and, therefore, require the use of special gasket materials. The alpha-thiocyano carbonyl compounds of the invention do not possess any of these undesirable properties.

Furthermore, the preparation of alpha-chloro ketones involves the use of elemental chlorine, the supply of which in times of national emergency and/or periods of rapid expansion in the chemical industry, becomes increasingly short and critical because of the numerous uses of chlorine for which there is no substitute. The process of this invention will therefore aid the industry appreciably by making available a preparation of well known and widely used vulcanization accelerators, 2-mercapto thiazoles, which does not involve the use of chlorinated reactants with their undesirable physical properties.

In the process of this invention there can be employed any alpha-thiocyano carbonyl compound. Such a compound will of course, contain the structure

and will have only the one oxygen attached to the carbonyl carbon atom, that is, it will be an alpha-thiocyano ketone or aldehyde. Ordinarily it will contain, in addition to the carbonyl oxygen atom and the nitrogen and sulfur atoms of the thiocyano group, only carbon and hydrogen atoms as when it possesses the structure

wherein $R_1$ and $R_2$ are hydrogen or hydrocarbon groups; however, $R_1$ and $R_2$ may also be radicals containing elements other than carbon and hydrogen present in non-reactive structure, as, for example, oxygen in ether linkages, sulfur in thioether linkages, nitrogen and oxygen in nitro groups, etc. All such alpha-thiocyano aldehydes and ketones are known types of compounds and can be readily prepared by the reaction of thiocyanogen with an aldehyde or ketone as follows:

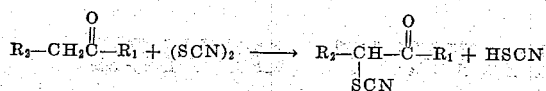

As examples of alpha-thiocyano carbonyl compounds which are suitable reactants for the process of this invention, there may be mentioned such alpha-thiocyano-aldehydes as thiocyano-acetaldehyde, alpha-thiocyano-n-propion-aldehyde, alpha-thiocyano-n-butyraldehyde, alpha-thiocyano-n-valeraldehyde, alpha-isopropyl-alpha-thiocyano-acetaldehyde, alpha-benzyl-alpha-thiocyano-acetaldehyde, alpha-phenyl-alpha-thiocyano-acetaldehyde, alpha-naphthyl-alpha-thiocyano-acetaldehyde, alpha-cyclohexyl-alpha-thiocyano-acetaldehyde, alpha-thiocyano-alpha-ethoxy-acetaldehyde, alpha-thiocyano-beta-chlorobutyraldehyde, and alpha-thiocyano-beta-ethoxy-butyraldehyde; and such alpha-thiocyano ketones as for example 3-thiocyano-propanone-2; 3-thiocyano-butanone-2; 3-thiocyano-pentanone-2; 3-thiocyano-hexanone-2; 3-thiocyano-heptanone-2; 3-phenyl-3-thiocyano-propanone-2; 3-cyclohexyl-3-thiocyano-propanone-2; 4-phenyl-3-thiocyano-butanone-2; 5-phenyl-3-thiocyano-pentanone-2; 6-phenyl-3-thiocyano-hexanone-2; 3-naphthyl-3-thiocyano-propanone-2; 5-p-tolyl-3-thiocyano-pentanone-2; 3-thiocyano-4-pentanone-2; 2-thiocyano-pentanone-3; 2-thiocyano-hexanone-3; 1-thiocyano-hexanone-2; alpha-thiocyano-propionophenone; 1-phenyl-3-thiocyano-butanone-2; 1-phenyl-4-thiocyano-pentanone-3; alpha-thiocyano-propiononaphthone; 4-thiocyano-hexanone-3; 3-thiocyano-heptanone-4; 2-thiocyano-octanone-3; alpha-thiocyano-pentanophenone; 1-phenyl-3-thiocyano-pentanone-2; 1-phenyl-4-thiocyano-hexanone-3; alpha-thiocyano-pentanonaphthone; 5-thiocyano-1-heptenone-4; 1-cyclohexyl-1-thiocyano-propanone; 1-cyclohexyl-2-thiocyano-propanone; 1-cyclohexyl-2-thiocyano-butanone; 1-methoxy-3-thiocyano-butanone-2; 1-(methyl-thio)-3-thiocyano-butanone-2; 2-thiocyano-1-isopropoxy-butanone-3; 2-thiocyano-1-(isopropyl-thio)-butanone-3; 2-thiocyano-1-ethoxy-butanone-3; 2-thiocyano-1-(ethyl-thio)-butanone-3; 2-thiocyano-1-o-nitro-phenyl-butanone-3; 2-thiocyano-1,5-di-phenyl-6-nitrohexanone-3; 3-thiocyano-1-butoxy-2-methylhexanone-4; 4-thiocyano-1-ethoxy-5-methylhexanone-3; 2-thiocyano-cyclopentanone; 2-thiocyano-cyclo-hexanone; 2,5-di(thiocyano)-1,4-cyclohexanedione; 2,3-di(thiocyano)-1,4-cyclohexanedione; 2,3-di(thiocyano)-1,4-pentanedione; 2,5-di(thiocyano)-1,6-decanedione; and 2-(alpha-thiocyano-acetonyl)-cyclohexanone.

Although any alpha-thiocyano carbonyl compound containing the structure hereinbefore set forth can be employed as a reactant according to the process of this invention, the alpha-thiocyano ketones, where R₁ in the general formula hereinbefore appearing is a hydrocarbon group, are preferred as reactants because at present they are more readily available.

Any of the mineral acids, such as hydrochloric, sulfuric, phosphoric and other mineral acids can be employed in the process of this invention; hydrochloric acid is the preferred mineral acid for this process. The quantity of acid to be employed in the process of this invention can be varied from 1.0 mole to 2.0 moles per mole of the alpha-thiocyano carbonyl compound present.

Any water-soluble salt of dithiocarbamic acid can be employed as a reactant in the process of this invention. For example, sodium dithiocarbamate, potassium dithiocarbamate and ammonium dithiocarbamate among others can be reacted with the alpha-thiocyano carbonyl to produce a 2-mercapto thiazole. However, all the water-soluble salts of dithiocarbamic acid are, in general, made from ammonium dithiocarbamate, this water-soluble salt is therefore the preferred reactant.

The quantity of reactants to be employed is not critical and can be varied according to the size of the reaction equipment to be employed. Regardless of the quantity of 2-mercapto thiazole to be prepared, it will, in general, be found to be most advantageous to employ from substantially equimolecular portions of the reactant to a 20% excess of the water-soluble dithiocarbamate; that is from 1.0 mole to 1.2 moles of the dithiocarbamate per mole of thiocyano carbonyl.

The following specific example will illustrate the details of the process of this invention.

EXAMPLE 1

To a reactor there was added 133 parts by weight of an aqueous solution containing 8 parts by weight (0.22 mole) of HCl and 25.8 parts by weight (0.2 mole) of 3-thiocyano-butanone-2. This mixture was stirred and cooled to a temperature between 5° and 10° C. There was slowly added to this cooled mixture over a period of one hour 29 parts by weight of an aqueous solution containing 20% by weight of ammonium dithiocarbamate (0.26 mole). The resulting reaction mixture was stirred and maintained at a temperature of from 5° to 10° C. for this period of addition of the dithiocarbamate. A gummy precipitate formed during the addition of the dithiocarbamate. The reaction mixture was stirred for an additional hour, removed from the reactor and filtered. The precipitate recovered was oily and contained some unreacted 3-thiocyano-butanone-2, which was removed from the precipitate by washing it with hexane to extract the unreacted thiocyano-butanone. The resulting product was in the form of white crystals which melted at 157° to 160° C. After the crystals were washed with benzene their melting point was 160° to 162° C. These crystals were mixed with authentic 2-mercapto 4,5-dimethylthiazole (M. P. 162°-164° C.). This mixture melted at 162° to 164° C. The product formed by this preparation was, therefore, 2-mercapto-4,5-dimethylthiazole.

The following examples in tabular form are presented to illustrate the variety of 2-mercapto thiazoles which can be prepared according to the process of this invention. In all these examples ammonium dithiocarbamate is the water-soluble dithiocarbamic acid salt employed as a reactant with the alpha-thiocyano carbonyl compound although as it will be readily understood any water-soluble salt of dithiocarbamic acid can be employed as a reactant. Thus only the thiocyano carbonyl is specifically named.

Products of reaction of ammonium dithiocarbamate with an alpha-thiocyano carbonyl compound

| Example No. | Thiocyano Carbonyl | Product |
|---|---|---|
| 2 | 1-thiocyanobutanone-2 | 2-mercapto-4-ethylthiazole. |
| 3 | Thiocyano acetaldehyde | 2-mercaptothiazole. |
| 4 | Alpha-thiocyano propionaldehyde | 2-mercapto-5-methylthiazole. |
| 5 | 2-isopropyl-2-thiocyano acetaldehyde | 2-mercapto-5-isopropylthiazole. |
| 6 | 2-phenyl-2-thiocyano acetaldehyde | 2-mercapto-5-phenylthiazole. |
| 7 | 3-thiocyano hexanone-2 | 2-mercapto-5-propyl-4-methyl-thiazole. |
| 8 | 4-phenyl-3-thiocyano-butanone-2 | 2-mercapto-5-benzyl-4-methyl-thiazole. |
| 9 | 2-thiocyano-heptanone-3 | 2-mercapto-4-methyl-5-n-butylthiazole. |
| 10 | 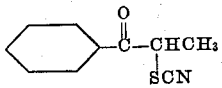 Alpha-thiocyano propionophenone | 2-mercapto-4-methyl-5-phenylthiazole. |
| 11 | 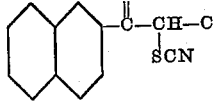 Alpha-thiocyano propiononaphthone | 2-mercapto-4-naphthyl-5-methyl-thiazole. |
| 12 | 3-thiocyano-octanone-4 | 2-mercapto-4-butyl-5-ethyl-thiazole. |
| 13 | 1-phenyl-4-thiocyano hexanone-3 | 2-mercapto-4-phenethyl-5-ethyl-thiazole. |
| 14 | 5-thiocyano-1-heptenone-4 | 2-mercapto-4-allyl-5-ethyl-thiazole. |
| 15 | 3-thiocyano-4-hexenone-2 | 2-mercapto-4-methyl-5-allyl-thiazole. |

Any of the thiocyano carbonyl compounds of the class hereinbefore defined can be employed as a reactant in place of those employed in the above examples to produce the corresponding 2-mercapto thiazole.

Although I have illustrated my invention with the preparation of certain specific 2-mercapto thiazoles, I do not thereby desire or intend to limit myself solely thereto, for as hitherto stated reactants which are the chemical equivalents of those employed may be substituted for the specific reactants and the precise proportions of the reactants can be varied, if desired, without departing from the spirit and scope of the invention as defined in the appended claims.

I claim:

1. The method which comprises reacting an alpha-thiocyano carbonyl compound with a water-soluble salt of dithiocarbamic acid in the presence of a dilute aqueous solution of a mineral acid thereby to form a 2-mercapto thiazole.

2. The method which comprises reacting an alpha-thiocyano carbonyl compound having the structure

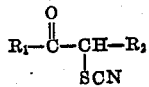

wherein $R_1$ and $R_2$ are members selected from the group consisting of hydrogen and hydrocarbon groups containing from 1 to 10 carbon atoms, with ammonium dithiocarbamate in the presence of a dilute aqueous solution of HCl thereby to form a 2-mercapto thiazole, and recovering said thiazole.

3. The method of claim 2 where the alpha-thiocyano carbonyl compound is an alpha-thiocyano ketone and $R_1$ and $R_2$ are hydrocarbon groups containing 1 to 10 carbon atoms.

4. The method which comprises reacting 3-thiocyanobutanone-2 with ammonium dithiocarbamate in the presence of a dilute aqueous solution of HCl thereby to form 2-mercapto-4,5-dimethylthiazole, and recovering this thiazole.

ROGER A. MATHES.

No references cited.